April 6, 1954

L. C. WHITON 2,674,403

FLUID CONTROL DAMPER

Filed Aug. 23, 1951

INVENTOR.
LOUIS C. WHITON
BY
Benj. T. Rauber
ATTORNEY

April 6, 1954 L. C. WHITON 2,674,403
FLUID CONTROL DAMPER
Filed Aug. 23, 1951 5 Sheets-Sheet 2
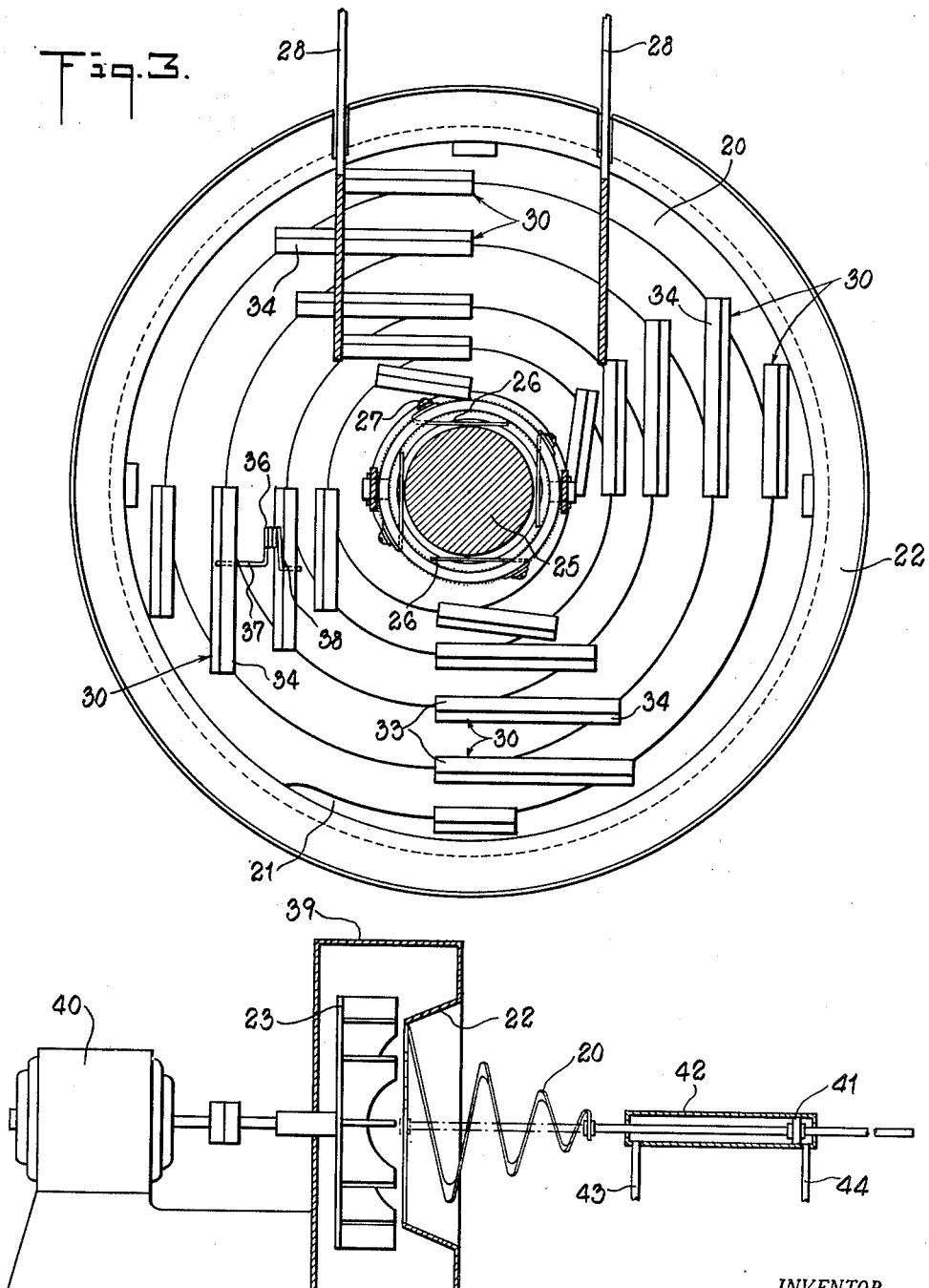
INVENTOR.
LOUIS C. WHITON
BY
Benj. T. Rauber
ATTORNEY

INVENTOR.
LOUIS C. WHITON
BY
ATTORNEY

April 6, 1954 L. C. WHITON 2,674,403
FLUID CONTROL DAMPER
Filed Aug. 23, 1951 5 Sheets-Sheet 4
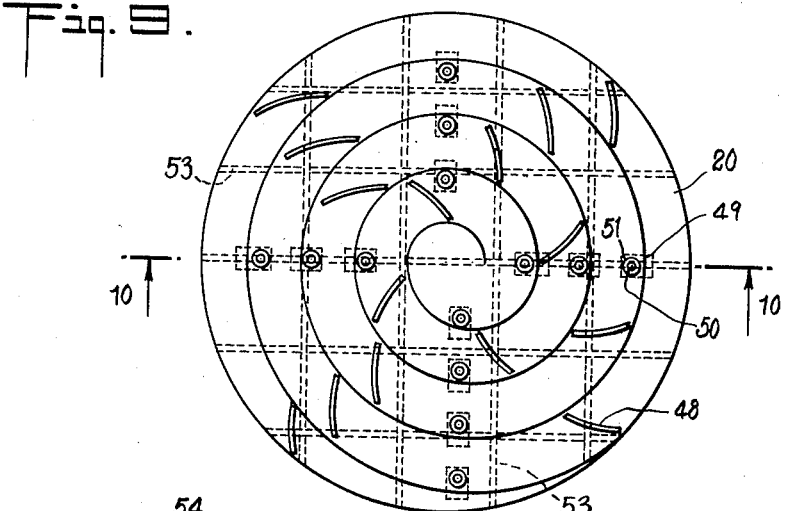
Fig. 9.
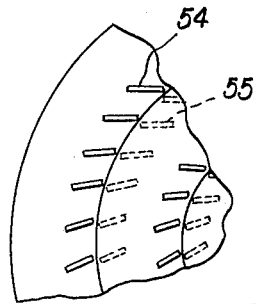
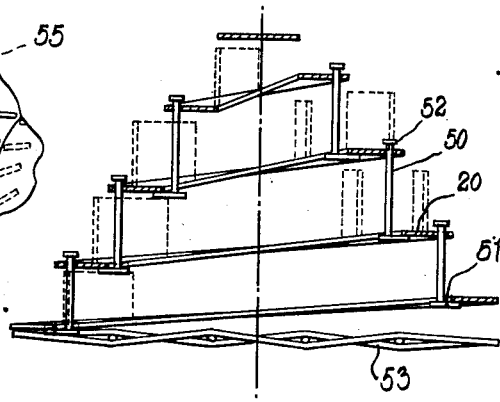
Fig. 10.
Fig. 11.
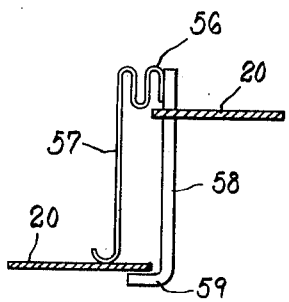
Fig. 12.
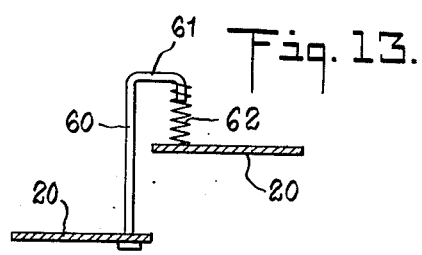
Fig. 13.
INVENTOR.
LOUIS C. WHITON
BY Benj. J. Rauber
ATTORNEY April 6, 1954    L. C. WHITON    2,674,403
FLUID CONTROL DAMPER Filed Aug. 23, 1951    5 Sheets-Sheet 5

INVENTOR.
LOUIS C. WHITON
BY Benj. T. Rauber
ATTORNEY

Patented Apr. 6, 1954

2,674,403

UNITED STATES PATENT OFFICE 2,674,403

FLUID CONTROL DAMPER

Louis C. Whiton, Westport, Conn., assignor to Prat-Daniel Corporation, South Norwalk, Conn., a corporation of New York Application August 23, 1951, Serial No. 243,325

12 Claims. (Cl. 230—114)

My present invention relates to a fluid control damper. The damper is directed generally to the control of fluids in which a tight closure is desired and in which the flow of fluid may be regulated or controlled with exactitude or precision in a continuous gradient. The damper has special advantages in the control of the flow of fluid to pumps, fans, and blowers, particularly those of radial flow.

In the control of the flow of fluid to the inlet of a fan or blower it is desirable to allow the fan to operate at a constant speed and to control the quantity of fluid by means of a damper.

Heretofore a damper of the louver type has been used. A damper of this type is subject to considerable leakage even when closed and does not enable desired variation in volume to be obtained. Furthermore dampers of this type do not recover any energy by spinning the gas in the direction of rotation of the fan.

In my invention I provide an inlet damper for fans and blowers of the above type in which leakage is reduced to a minimum; in which an accurate control of the variations of fluid flow is attainable; and in which the fluid may be rotated in the direction of rotation of the fan as it passes through the damper.

My invention also provides an inlet damper formed of parts which, in closed position, lie in a closely fitting relation transverse to the direction of flow or to the axis of the fan, but which may be moved progressively and relatively in an axial direction to provide rotatory passages into the fan inlet.

The damper may be in the form of a spiral extending from a central area to the outer edge of the damper, or may be in the form of a central disc and annular overlapping discs which may be moved successively in an axial direction and provided with guide vanes to direct the passing air into a circular or helical path.

In operation, when the central part of the damper is displaced relative to the outer part, an opening is formed at the center and with increasing displacement additional openings are formed between those parts more distant from the center. In the case of a spiral there is a slanting or sloping of the displacing metal which tends to give the air passing into the damper a rotating or helical direction. Inclined vanes are provided between each set of discs to direct the air or other fluid into a circulatory motion in the direction of rotation of the fan.

The central part may be displaced in opening direction by any suitable means which may be hand operated or operated by an automatic control. As the valve is opened the entering air is rotated in the direction of rotation of the fan by the inclination of the spiral or by the deflecting vanes or by both. Thereby the energy formerly lost in friction and eddying is transformed into kinetic energy in the direction of flow, reducing the power required to drive the fan.

The various features of the invention are illustrated by way of example in the accompanying drawings, in which—

Fig. 3 is an end view of the damper;

Fig. 4 is a diagrammatic sketch showing a fan or blower having a single inlet equipped with the control damper of my invention;

Fig. 9 is an end view of a spiral damper having deflecting vanes to direct the entering gas or fluid in a rotary direction and having stops to limit the opening between successive turns of the spiral;

Fig. 10 is an end view of the damper of Fig. 9;

Fig. 11 is a view of a part of a damper having a modified arrangement of air deflecting vanes;

Figs. 12 and 13 are detail views of damper stops;

Figures 1, 2:
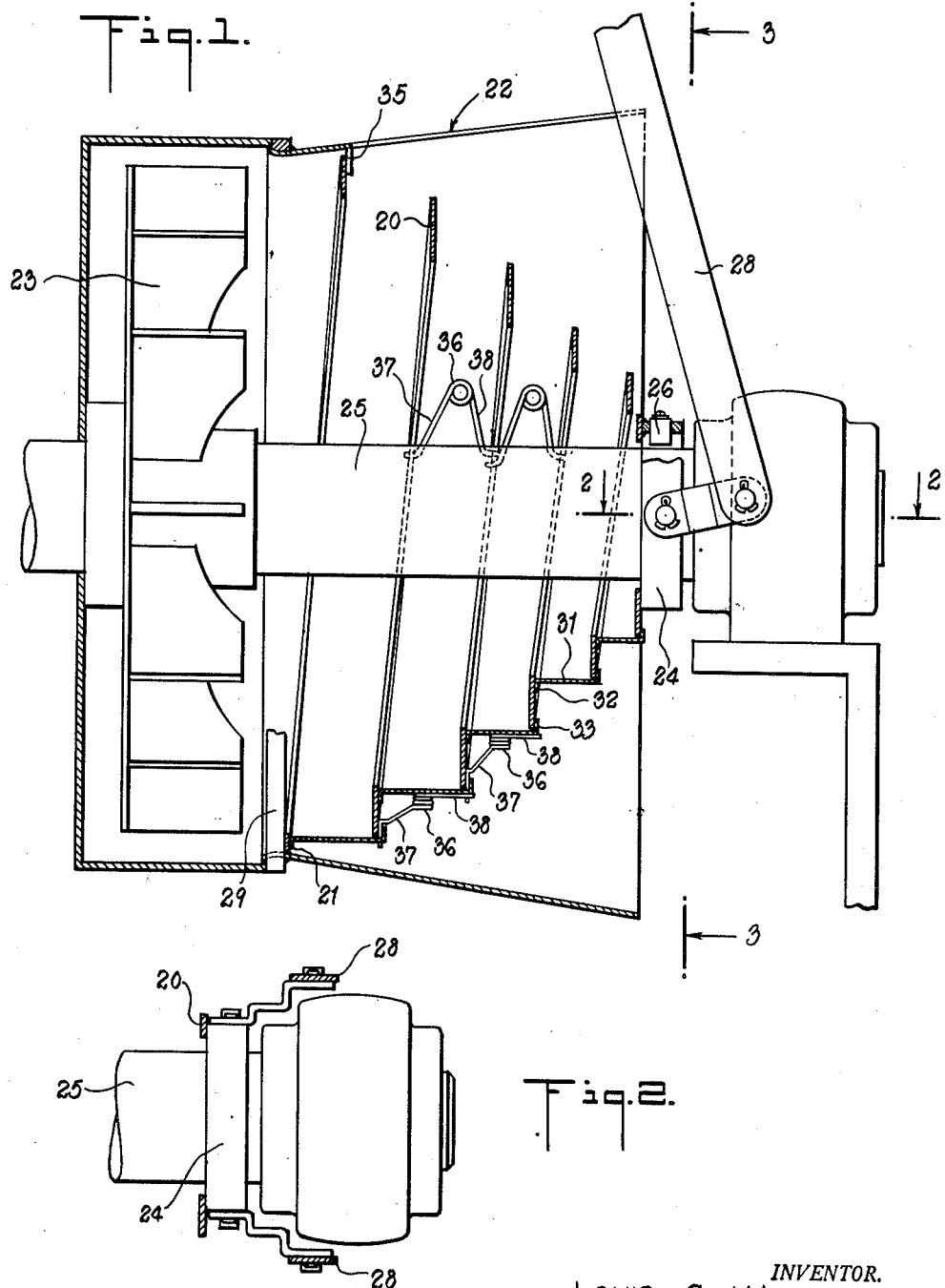
Fig. 1 is a longitudinal section of a spiral control valve embodying my invention.
Fig. 2 is a view at right angles to that of Fig. 1 of a part of the actuating mechanism of the damper.

Referring more particularly to Figs. 1, 2 and 3, the damper comprises a continuous spiral 20, welded or otherwise secured at its larger end 21 to the throat of an inlet 22 of a fan 23 and secured at its smaller end to an axially movable ring 24. The ring 24 may be guided on the shaft 25 of the fan and kept from direct contact therewith by leaf springs 26 secured to the ring by screws 27 and having a free end which is deflected into contact with the ring when the ring is displaced toward the shaft. The ring is moved axially from collapsed or closed position to fully open position, as shown in full lines in the drawing, by means of an actuating lever 28 or other suitable actuating device. When closed, the turns of the spiral may rest against, and be supported by, a grid 29 to support the spiral against the pressure of the air or fluid in the inlet.

The two interior turns of the spiral are preferably made narrower than in the next two turns to improve or reduce the resistance to flow of the gas at full opening. Also the extreme outer turn of the spiral is also preferably narrower than the two inner turns adjacent to it to permit the best flow of air since this turn is closest to the inlet cone or throat of the fan.

Guides 30 are secured on the faces of the spirals facing the inlet or source of the fluid. These guides serve to limit the movement of the turns of the spiral relative to adjacent turns and also to give the air, gas, or other fluid passing through the valve, a rotating or spinning movement in the same angular direction as that of the fan blades. For these purposes, each guide 30 is arranged tangentially to the inner edge of the spiral and has a web 31 upright from the surface of the spiral, to which it is secured by a flange 32, and has at its free edge a flange 33 overlying the outer margin of the next inner turn. The opening of each turn of the spiral relative to the next or adjacent turn is thus limited by contact with the flange 32. The flanges also project beyond the outer edge of their respective turns of the spiral as at 34 to contact and rest against the inner margin of the adjacent outer turn and thus to prevent the inner turns from being moved or pushed inwardly past closed position by the pressure of the inlet air or gas. The opening of the outermost turn of the spiral is limited by brackets 35 secured to the inner surface of the inlet throat 22.

The heights and lengths of the guides 30 need not be uniform but may be varied to provide for different openings between successive turns of the spiral and to obtain minimum resistance caused by the guides and a maximum whirl of the gas or air in the direction of rotation of the fan. For example, the small spirals are permitted to be separated a lesser distance than the larger spirals to provide a greater free area flow than would be the case if the spacing were uniform throughout. A maximum free area is desirable when the damper is fully open.

Under some conditions there may be a tendency for turns of the spiral to flutter. This tendency may be counteracted by deadening the resiliency of the turns. For example it may be overcome or lessened by means of coil springs 36 each connected to one turn of the spiral by an arm 37 and to an adjacent turn by an arm 38.

It will be understood that the number and spacing of the guides or deflectors 30 and springs 36 will be selected in accordance with the size of the damper and other considerations. The particular number and arrangement illustrated is merely by way of example. The guides could be mounted on the outlet side of the spiral rather than the inlet side, as shown.

The arrangement of the damper for actuation by a fluid operating mechanism is shown diagrammatically in Fig. 4, the fan being mounted in a casing 39 and driven by a motor 40, while the spiral is extended from the closed position shown in broken lines to the open position shown in full lines, by a fluid actuated piston 41 in a cylinder 42 having connecting pipes 43 and 44 for alternate admission and exhaust of fluid to and from opposite sides of the piston.

Figure 5:
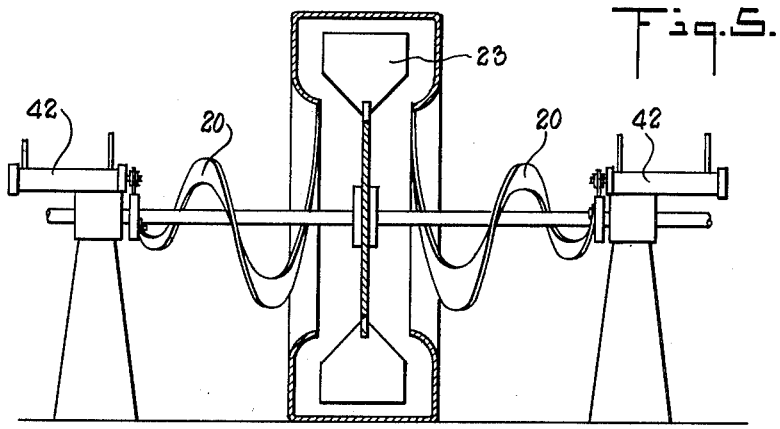
Fig. 5 is a similar diagrammatic sketch showing a double inlet fan or blower equipped with dampers of my invention.

It will be evident that a pair of dampers may be employed to admit fluid to opposite sides of the fan as shown in Fig. 5. Here the two spirals 20, the open position of which is exaggerated for purposes of illustration, are mounted on opposite sides of the fan 23 and actuated by individual cylinders, either simultaneously or otherwise.

Figure 6:
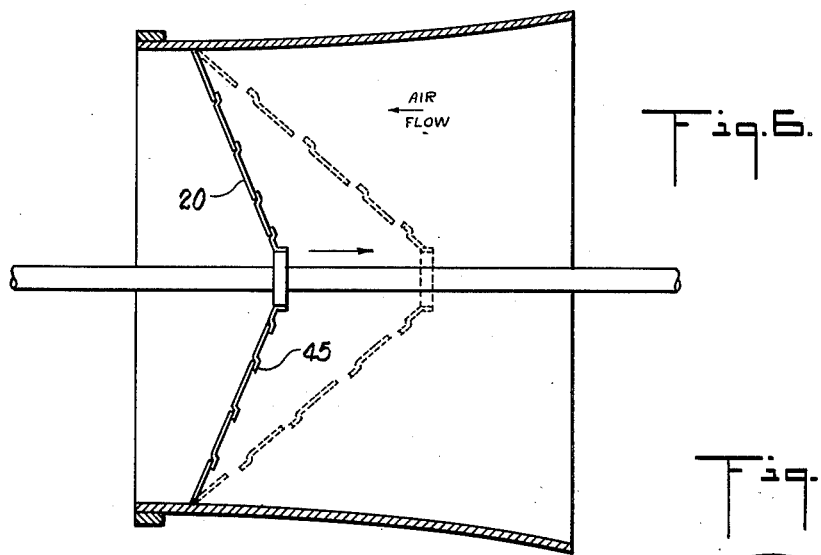
Fig. 6 is a longitudinal section of an inlet and a modified form of damper embodying the invention.

A modified form of spiral is shown in Fig. 6. In this form the spiral is cone shaped when closed, the slope of the cone being somewhat exaggerated in the drawing, the turns of the spiral have overlapping edges 45 to insure a tight closure when the damper is closed. The conical shape provides increased strength to insure that it can not be bent toward the fan inlet under the pressure differential between the inlet and outlet of the damper. This type of damper may be provided with suitable deflecting vanes if desired. The damper is opened to the position shown in broken lines.

Figure 7:
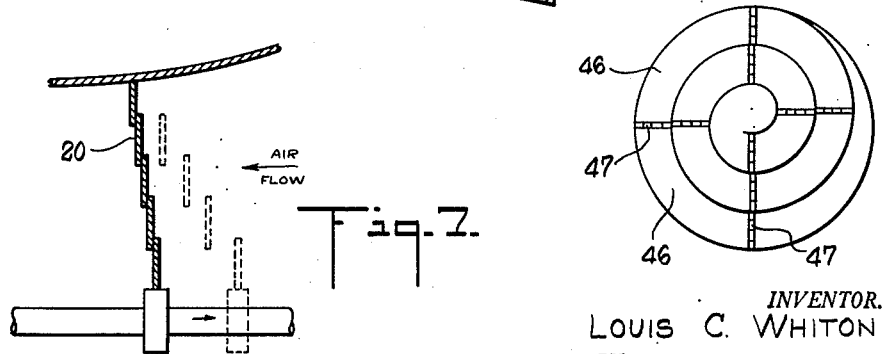
Fig. 7 is a longitudinal section of an inlet and another form of damper embodying the invention.

Fig. 7 illustrates another type of overlapping spiral, the turns of the spiral being, however, flat rather than conical.

Figure 8:
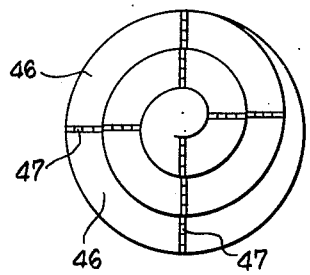
Fig. 8 is an end view of the damper of Fig. 7.

Fig. 8 illustrates diagrammatically a spiral formed in sections 46 of rigid or substantially rigid material joined on radial hinges 47, so that they may be opened to a small angle, such as 5° or 10°. Any suitable number and appropriate size of sections may be employed to form the spiral. Deflecting vanes may be used on the spirals of Figs. 7 and 8.

Fig. 9 illustrates a spiral 20 having curved deflectors 48 on the inlet side of the spiral independent of limiting stops 49. The deflectors may be arranged at selected distances or intervals and terminate at the inner edge of the spiral. The stops may be uprights having a lip overlapping the outer edge or margin of the adjacent turn of the spiral.

In Fig. 10 the stops are in the form of pins 50 mounted in tongues 51 on the under or outlet side of the spirals to project under the outer margin of an adjacent turn so that the pins project through openings in said margin. The pins are provided with heads 52 which limit the separation of one turn of the spiral from an adjacent turn.

In Figs. 9 and 10 a supporting grid of crossed and interwoven rods 53 are shown to protect the spiral from being drawn or pushed inwardly past closed position by a pressure differential of the entering fluid.

Fig. 11 shows a modification having deflecting vanes or guides 54 on the inlet side of the spiral and terminating at the inner edge of their respective turns and vanes or guides 55 on the outlet side leading from the outer edge of their respective turn. This combination of vanes provides a greater or more positive spin of the passing fluid. The spiral is opened in a direction opposite to the direction of flow of the fluid.

In Fig. 12 is shown a modification of the spring to prevent flutter and a separation limiting element. In this modification a coil spring 56 is mounted on one turn of the spiral at its outer edge and having an extension 57 extending at an angle or slope to bear against the next turn at its inner edge. A pin 58 is fixed to one turn of the spiral and is bent as at 59 to overlap the next turn and limit the extent of its opening.

In the modification shown in Fig. 13, a pin 60 mounted in one turn of the spiral near its inner edge is bent to overlap the outer margin of the next turn as at 61 and is provided with a coil spring 62 bearing against the overlapped turn.

The spring 62 presses against the overlapped turn as the turns separate until further separation is stopped by the overlapping bent end.

Figure 14:
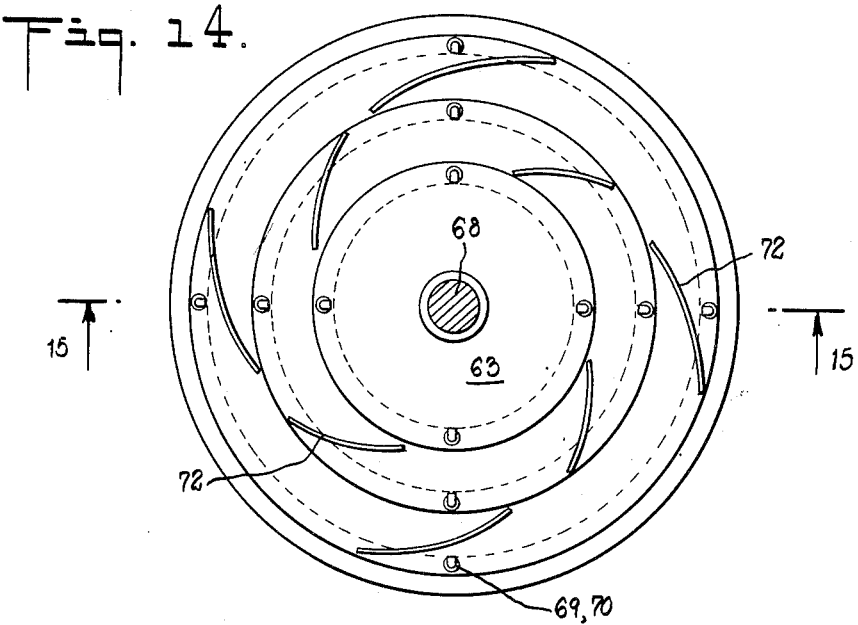
Fig. 14 is an end view and Fig. 15 is a longitudinal section of a damper of circular and annular, longitudinally displaceable plates having deflecting vanes and displacement stops.
Figure 15:
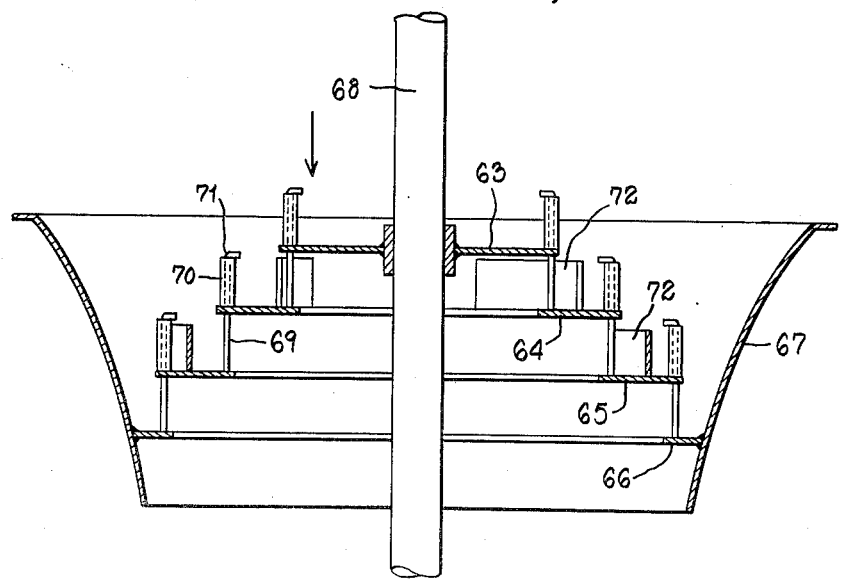

Figs. 14 and 15 illustrate an embodiment in which the axially separable damper is in the form of a central disc 63, and a series of coaxial, annular discs 64, 65 and 66 which, as shown may overlap the outermost disc 66 being secured to the inlet throat 67 of a fan. The central disc is slidable on a shaft 68 by suitable actuating mechanism, not shown, from closed position in which the discs are in overlapping contact and rest against the outermost disc to the fully separated or open position shown in full lines in Fig. 15. The extent of opening or separation of the discs is limited by pins 69 extending from the inner margin of one disc freely through openings through the outer margin of the next overlapping disc and through a guiding tube or guide 70 and having each a head 71 to be engaged by the end of the guide 70 when the limit of separation is reached. When the central disc 63 is moved outwardly against the pressure of the incoming fluid, indicated by the arrow of Fig. 15, it separates from the next adjacent disc 64 providing an opening that increases progressively with the separation of the discs. When the disc 63 reaches the limit of separation from the disc 64, the heads 71 of the pins on disc 64 engage the ends of the guides 70 of disc 63 against the flow of incoming fluid, pulls the disc 64 from contact with the disc 65 thereby adding to the passage space for the entrance fluid. This is repeated until the damper is fully open as shown in Fig. 15. The inflowing fluid is spun or whirled in the direction of rotation of the fan by means of guide vanes 72 which, as shown may be curved, mounted at suitably spaced intervals on the windward sides of the discs and terminating at the inner edge of their respective discs.

Through the above invention I provide a control damper which is substantially fluid-tight when closed and which upon opening imparts to the fluid passing through it a rotation or spin in the direction of rotation of the fan. This rotation relieves the fan rotor from the task of bringing the fluid from a stationary or static state, so far as rotation is involved, to this initial speed of rotation and thus reduces the load on the fan.

While the damper or plate has been illustrated by way of example as secured at its periphery to the wall of the inlet and with the central part movable axially, it will be understood that this is merely one way of obtaining a relative displacement of the inner or central and outer or peripheral parts of the damper, and that the central part might be made stationary and the peripheral part movable in the direction of flow of the fluid. Or instead of having the relative displacement of the central part to the peripheral part in the direction from which the fluid enters, this arrangement might be reversed. Generally, however, it is more convenient to have the peripheral part fixed to the wall of the inlet and the central part movable toward the direction from which the air is supplied.

While the damper has been described more particularly with respect to the inlets of blowers, pumps and fans, it may be used to advantage for the control of fluid in general inasmuch as the openings of the spiral or discs provide tight closures when closed and a very gradual and accurately controllable opening for the fluid.

Having described my invention, what I claim is:

1. A fluid control which comprises a closure means to span an opening said closure means comprising portion at increasing radial distances from the central part of said closure means, said portions meeting on edges curved about said central part and separating at said edges upon relative axial displacement of said portions and deflecting vanes standing out from said portions and in a non-radial direction toward the central part of said closure means.

2. The fluid control of claim 1 in which the curvature of said edges is spiral and in which the closure means is integral and continuous between said edges from a central portion to the perimeter of said closure means.

3. The fluid control of claim 1 in which the curvature of said edges is spiral and in which the closure means between said edges comprises portions hinged on radial lines.

4. The fluid control of claim 1 in which said closure means comprises annular concentric portions.

5. The fluid control of claim 1 having vibration lessening springs between adjacent edges of said portions.

6. The fluid control of claim 1 having a supporting grid at the leeward side of said closure means.

7. The fluid control of claim 1 having stops to limit the relative axial displacement of said portions.

8. The fluid control of claim 1 having pins projecting from one portion in a position to limit the relative displacement of said portions and a spring connection from one portion to an adjacent portion.

9. A fluid control which comprises a closure means to span an opening, said closure means comprising portions at increasing radial distances from the central part of said closure means, said portions meeting on edges curved about said central part and separating at said edges upon relative axial displacement of said portions, deflecting vanes standing out from said portions and in non-radial direction toward the central part of said closure means and a radial flow fan having a central inlet at the outlet side of said opening and closure means.

10. The fluid control of claim 9 in which the curvature of said edges is spiral.

11. The fluid control of claim 9 in which said closure means comprises concentric, annular portions.

12. The fluid control of claim 9 having a supporting grid on the leeward side of said closure means.

References Cited in the file of this patent

UNITED STATES PATENTS

| Number | Name | Date |
|---|---|---|
| 1,167,320 | Thomas | Jan. 4, 1916 |
| 1,550,120 | Stande | Aug. 18, 1925 |
| 1,858,071 | Chester | May 10, 1932 |
| 2,373,166 | Chapman | Apr. 10, 1945 |
| 2,405,282 | Bermann | Aug. 6, 1946 |
| 2,421,877 | Gross | June 10, 1947 |
| 2,435,092 | Meyer | Jan. 27, 1948 |
| 2,443,263 | Meyer | June 15, 1948 |

FOREIGN PATENTS

| Number | Country | Date |
|---|---|---|
| 20,861 | Great Britain | 1893 |
| 53,526 | Norway | Feb. 5, 1934 |
| 648,838 | France | Aug. 20, 1928 |